United States Patent [19]
Gutman et al.

[11] Patent Number: 4,794,540
[45] Date of Patent: Dec. 27, 1988

[54] ITERATIVE SPLINE FUNCTION CONTROLLED POSITIONING MECHANISM

[75] Inventors: Yevsey Gutman, Minneapolis; William J. Langer, Eden Prairie, both of Minn.

[73] Assignee: MTS Systems Corporation, Minneapolis, Minn.

[21] Appl. No.: 876,995

[22] Filed: Jun. 18, 1986

[51] Int. Cl.$^4$ .................. G05B 19/00; G06F 15/46
[52] U.S. Cl. ..................... 364/474.29; 364/513; 364/577
[58] Field of Search .............. 364/513, 474, 475, 169, 364/723, 577; 318/573

[56] References Cited

U.S. PATENT DOCUMENTS

| | | | |
|---|---|---|---|
| 3,869,601 | 3/1975 | Metcalf | 343/50 P |
| 4,063,453 | 12/1977 | Gram | 73/103 |
| 4,086,522 | 4/1978 | Engleberger | 364/513 |
| 4,258,425 | 3/1981 | Ramsey | 364/513 |
| 4,262,336 | 4/1981 | Pritchard | 364/169 |
| 4,409,650 | 10/1983 | Noguchi | 364/169 |
| 4,453,221 | 6/1984 | Davis et al. | 364/513 |
| 4,496,279 | 1/1985 | Langer | 901/29 |
| 4,642,752 | 2/1987 | Debarbieri | 364/167 |
| 4,663,726 | 5/1987 | Chand et al. | 364/169 |

OTHER PUBLICATIONS

Johnson, Herbert C., "Mechanical Test Equipment in the Sixties: A Decade of Radial Change,"*Closed Loop*, pp. 15–21, Fall/Winter 1974.
Kalyanakrishan, R., "A Bit-Slice Controller for Cubic Spline Generation," *Display*, pp. 93–96, Apr. 1984.

*Primary Examiner*—Jerry Smith
*Assistant Examiner*—Allen MacDonald
*Attorney, Agent, or Firm*—Kinney & Lange

[57] ABSTRACT

An iterative spline function controlled positioning mechanism such as a machine tool. A movable element of the machine tool is driven about a plurality of axes under computer control along a path formed by a plurality of sections. Each of the path sections is represented in parametric form by spline functions. The element is driven through a plurality of intermediate positions approximating positions on the path sections. An iterative algorithm implemented by the computer permits efficient computation of the intermediate positions.

30 Claims, 5 Drawing Sheets

Fig. 1

*Fig. 3* $p_n(t) = a_{n,0} + a_{n,1}t + a_{n,2}t^2 + \ldots a_{n,M}t^M$, $n = 1-N$

*Fig. 4* $P_1 = \begin{bmatrix} p_1(t_1), p_2(t_1) \ldots p_N(t_1) \end{bmatrix}$
$P_2 = \begin{bmatrix} p_1(t_2), p_2(t_2) \ldots p_N(t_2) \end{bmatrix}$
$P_3 = \begin{bmatrix} p_1(t_3), p_2(t_3) \ldots p_N(t_3) \end{bmatrix}$

*Fig. 5* $PI_i = \begin{bmatrix} p_{1,i}, p_{2,i}, \ldots p_{N,i} \end{bmatrix}$

*Fig. 7* $p_{n,i} = p_{n,(i-1)} + D1_{n,(i-1)}$;
$Dm_{n,i} = Dm_{n,(i-1)} + D(m+1)_{n,(i-1)}$, for each order $m = 1, 2, \ldots M-2$; and
$D(M-1)_{n,i} = D(M-1)_{n,(i-1)} + DM_{n,0}$.

*Fig. 8* $Dm_{n,s\Delta t} = D(m-1)_{n,(s+1)\Delta t} - D(m-1)_{n,s\Delta t}$ where:
$Do_{n,s\Delta t} = p_n(s\Delta t)$; and
$\Delta t = (t_2 - t_1)/I$

Fig.6

Fig.14 $\quad t_2 - t_1 = \sqrt{(p_1(t_2) - p_1(t_1))^2 + \cdots (p_N(t_2) - p_N(t_1))^2} / v$ Fig.15 $\quad \Delta t_i = (t_2 - t_1)/I$ Fig. 10 $p_{n,i} = p_{n,(i-1)} + D1_{n,(i-1)}$;

Fig. 13 $v_1(t_3) = \frac{1}{2}\left[\frac{p_1(t_2)-p_1(t_1)}{t_2-t_1} + \frac{p_1(t_3)-p_1(t_2)}{t_3-t_2}\right]$

ITERATIVE SPLINE FUNCTION CONTROLLED POSITIONING MECHANISM

BACKGROUND OF THE INVENTION

1. Field of the Invention

The present invention relates to computer controlled positioning mechanisms. In particular, the present invention is an iterative spline function controlled machine tool.

2. Description of the Prior Art

Computer controlled positioning mechanisms or machine tools such as contouring machines, welding machines, and robot arms are well known and in widespread application. Machines of this type include a tool element or other assembly which is movable about one or more motion axes. In response to a set of control points programmed into the machine tool, a computer will generate commands causing the tool element to be driven along a smooth path defined by the control points.

Oftentimes, the desired path of motion represented by the control points is a complex one which is not easily represented in mathematical terms. In these applications the path is typically broken up into sections having end points defined by the control points, and individual or spline functions (polynomial equations) are used to characterize the path sections between the control points. A plurality of intermediate positions about the path sections are computed utilizing the spline functions. The tool element is then linearly driven between the computed intermediate positions. The spline functions are fitted together at the control points to produce a continuous function over the desired path of motion. One machine tool of this type is described in the Ramsey et al U.S. Pat. No. 4,258,425 which is entitled SELF-PROGRAMMED MECHANICAL WORKING APPARATUS.

The use of spline functions is also disclosed in the Metcalf U.S. Pat. No. 3,869,601 entitled COMPUTING APPARATUS FOR TRACKING MOVING OBJECTS.

One drawback with computer controlled machine tools such as those described above is the fact that a very large number of mathematical operations must be executed by the computer to calculate each of the intermediate positions about each of the path sections. Assuming, for example, that the spline function characterizing each axis of motion along each path section is a third order polynomial, six multiplication and three addition operations are needed to evaluate each intermediate position of each axis of motion. Even with fast computers, this method is inefficient and slow. Although more efficient iterative spline function techniques for generating curves for computer graphics are known, as disclosed for example in the article entitled "A Bit-Slice Controller For Cubic Spline Generation" by R. Kalyanalkrishnan and C. S. Moghe published in Displays, April 1984, algorithms of this type have never been applied to computer controlled machine tools.

It is evident that there is a continuing need for improved computer controlled machine tools. A computer controlled machine tool which utilizes an iterative algorithm to generate data representative of positions approximating those about path sections characterized by spline functions would be especially desirable. The algorithm must be applicable to machine tools having any number of axes, and be applicable to spline functions of any order. All data, including the polynomial coefficients of the spline functions, should be calculated utilizing a set of control points and initial condition data programmed into the machine tool computer. Furthermore, the machine tool should also be capable of driving the machine element along a desired path at constant velocity. The machine tool could be efficiently controlled by an algorithm of this type.

SUMMARY OF THE INVENTION

The present invention is an apparatus for driving a movable element in space about N axes of movement between a first position $P_1=[p_1(t_1), p_2(t_1), \ldots p_N(t_1)]$, and a second position $P_2=[p_1(t_2), p_2(t_2), \ldots p_N(t_2)]$. The movable element is driven along a first path section represented in parametric form as a function of an independent variable t by M-order polynomial equations of the form $p_n(t)=a_{n,0}+a_{n,1}t+a_{n,2}t^2+ \ldots a_{n,M}t^M$. I intermediate positions $PI_i=[p_{1,i}, p_{2,i} \ldots p_{N,i}]$ for each $i=1, 2, \ldots I$ separated by subintervals $\Delta t$ and approximating positions along the first path section intermediate the first and second positions during an interval $t_1 \leq t \leq t_2$ are computed. The element is then driven from the first position, through the intermediate positions, to the second position.

Input means such as a terminal are adapted to receive input data. Input data includes data representative of the first position $p_n(t_1)$, and the second position $p_n(t_2)$, of the element on each of the N axes, and data representative of at least $M-1$ derivatives of the polynomial equations for each of the N axes at the first and second element positions. The data representative of the at least $M-1$ derivatives and the first and second positions characterizes at least $M+1$ initial condition values of element position and motiong along each axis. Input data representative of the interval $(t_2-t_1)$, and data representative of the number, I of intermediate positions $PI_i$, is also received.

Computer means responsive to the input means compute data as a function of the input data and produce signals representative thereof. Polynomial coefficients $a_{n,m}$ for each of the M orders of each of the N axes are computed by simultaneously solving, for each axis, a set of at least $M+1$ equations describing one of the least $M+1$ initial condition values in terms of the polynomial coefficients. Initial difference values $Dm_{n,0}$ for each of the M orders of each of the N axes are also computed. These difference values approximate an average value of the derivatives of the polynomial equations over a first subinterval $\Delta t$. The difference values $Dm_{n,0}$ can be determined and evaluated in terms of the polynomial coefficients by recursively evaluating the following equations:

$$Dm_{n,s\Delta t}=D(m-1)_{n,(s+1)\Delta t}-D(m-1)_{n,s\Delta t},$$

where:
$DO_{n,s\Delta t}=p_n(s\Delta t)$; and $\Delta t=(t_2-t_1)/I.$

Data representative of the first position $P_1$ and the second position $P_2$ and intermediate positions $PI_i$ are also computed. Intermediate positions $PI_i$, for each of the N axes, are computed by iteratively evaluating the following equations:

$$p_{n,i}=p_{n,(i-1)}+D1_{n,(i-1)};$$

$Dm_{n,i} = Dm_{n,(i-1)} + D(m+1)_{n,(i-1)}$ for each order $m = 1, 2, \ldots M-2$; and $D(M-1)_{n,i} = D(M-1)_{n,(i-1)} + DM_{n,0}$;

Actuator means responsive to the computer means move the element from the first position, through the intermediate positions, to the second position.

In preferred embodiments the apparatus drives the element from the second position through a plurality of intermediate positions along a second path section, and to a third position, in a similar manner. The independent variable can be used to represent time or path length. The algorithm implemented by the computer enables an efficient generation of data needed to control the machine tool.

DETAILED DESCRIPTION OF THE PREFERRED EMBODIMENTS

The present invention is a computer controlled positioning mechanism or machine tool such as a contouring machine, welder, milling machine, robot arm or the like. Machine tools of this type all include an element such as a cutting tool or robot wrist which is movably driven in space about at least one, and often a plurality, of axes. An iterative algorithm is implemented by the computer to efficiently generate approximations to spline functions representative of a desired program of movement.

Figure 1:
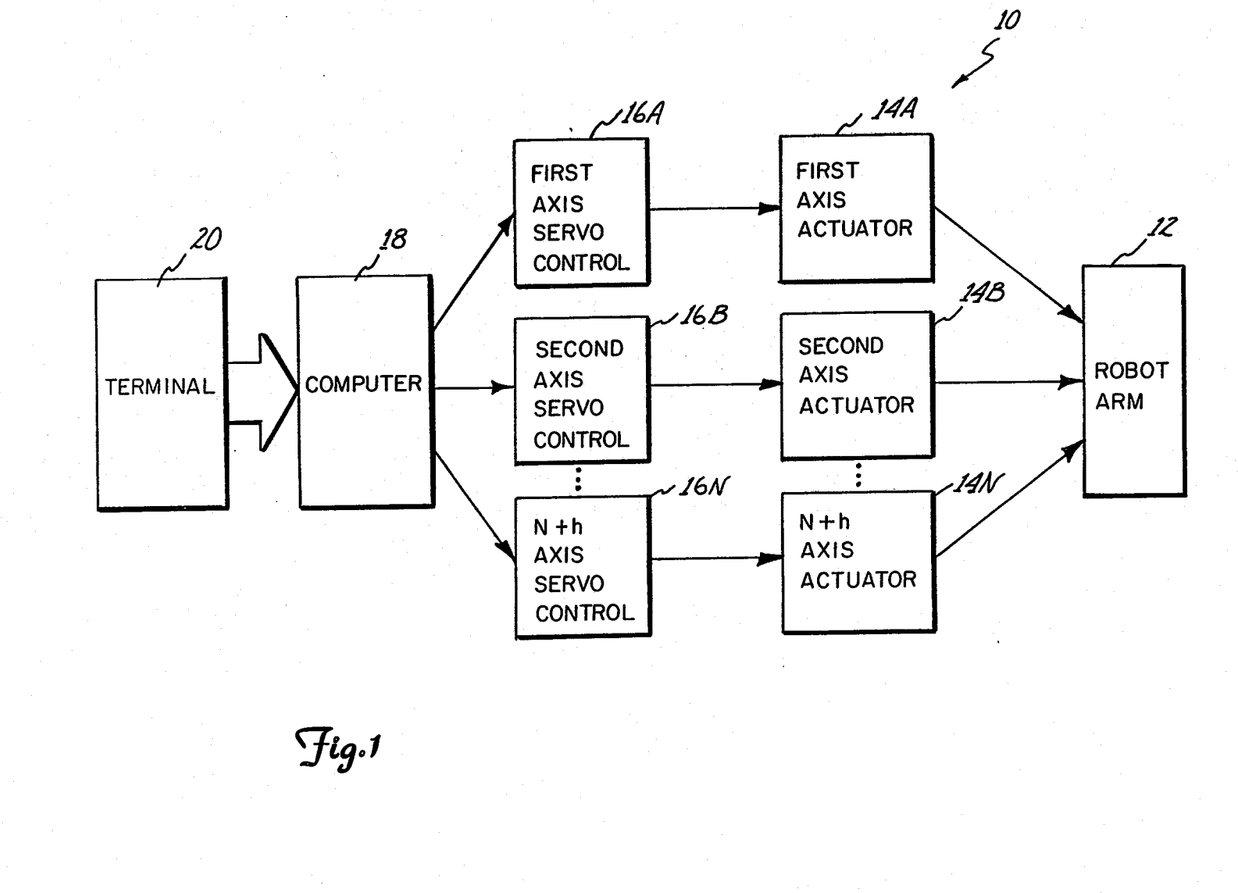
FIG. 1 is a block diagram representation of a robot machining system in accordance with the present invention.

One embodiment of the present invention, robot machining system 10, is illustrated generally in FIG. 1. Machining system 10 includes a robot wrist or arm 12 which is capable of being physically driven or moved about at least one, or N, axes of movement. Robot arm 12 can, for example, be driven about linear and orthogonal x, y, z axes, and a rotational axis $\theta$. Movement of robot arm 12 about each of the N axes is produced by actuators 14A-14N, respectively, in response to servo control signals provided by servo controllers 16A-16N, respectively. Input data representative of desired positions and motion characteristics of robot arm 12 is provided to computer 18 by a source such as terminal 20. In response to the input data, computer 18 produces position signals representative of a desired program of movement of robot arm 12 on each of the N axes. The position signals are representative of data computed by computer 18 utilizing the iterative algorithm hereinafter described.

Motion of robot arm 12 about a first, second, and third axis (i.e., N=3) as a function of an independent variable t is described with reference to FIG. 2. As shown, robot arm 12 is driven in space along a path 22 between first, second, and third positions $P_1$, $P_2$, and $P_3$, respectively. Positions $P_1$, $P_2$, and $P_3$ are the positions of robot arm 12 at variable $t=t_1$, $t_2$, and $t_3$, respectively. Path section 22A which is between positions $P_1$ and $P_2$, and path section 22B which is between positions $P_2$ and $P_3$, are each mathematically described by separate individual or spline functions which are continuous at their point of intersection, i.e., $P_2$. Path sections 22A and 22B are each described or represented as a function of an independent variable t by N, or in the example shown in FIG. 2, three, M-order parametric equations such as that illustrated in FIG. 3. using this convention, positions $P_1$, $P_2$, and $P_3$ of robot arm 12 can be described as sets or ensembles of its positions about each of the N axes, $p_1(t)-p_N(t)$, at variables $t=t_1$, $t_2$, $t_3$, respectively, as illustrated for example in FIG. 4.

Figure 2:
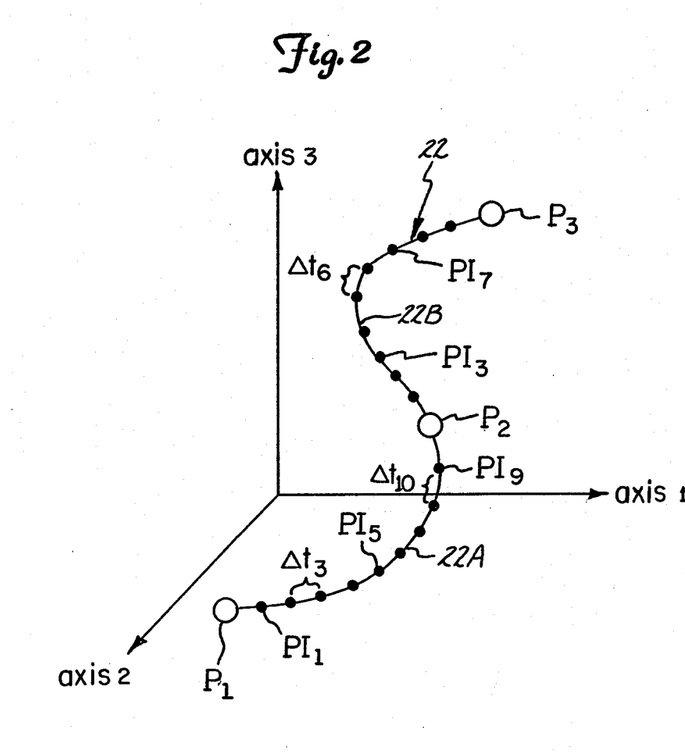
FIG. 2 is a graphic illustration of a three-dimensional path about which the robot arm of the machining system illustrated in FIG. 1 can be driven.

Actuators 14A-14N drive robot arm 12 along path sections 22A-22B as a function of the signals produced by computer 18 by linearly driving the arm along a plurality, or I, subintervals $\Delta t_i$ to intermediate positions $PI_i$ as shown in FIG. 2. Each intermediate position $PI_i$ is representative of a position of robot arm 12 on path sections 22A and 22B between positions $P_1$ and $P_2$, and $P_2$ and $P_3$, respectively. In the example shown in FIG. 2, robot arm 12 is linearly driven along I=10 subintervals $\Delta t_i$. Intermediate positions $PI_{10}$ for both path sections 20A and 20B are positions $P_2$ and $P_3$, respectively.

Figure 6:
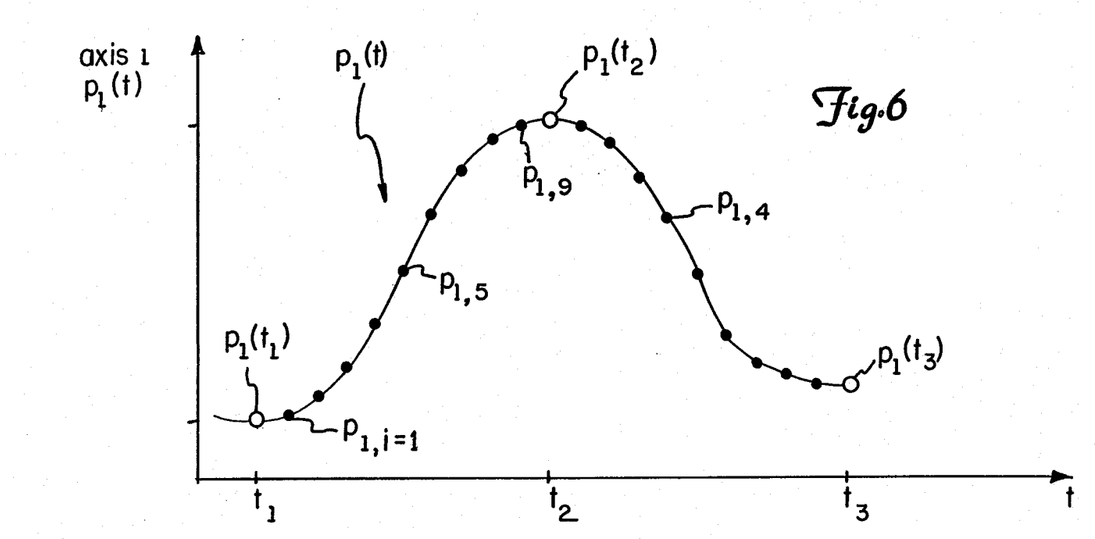
FIG. 6 is a graphic representation of the motion of the robot arm about one of the axes illustrated in FIG. 2.

Movement of robot arm 12 as a function of independent variable t about axis 1 in FIG. 2, which is representative of all N axes, is illustrated in FIG. 6. The first, second, and third positions of robot arm 12 along the first axis are characterized as $p_1(t=t_1)$, $p_1(t=t_2)$, and $p_1(t=t_3)$, respectively. Using this same convention, intermediate positions of arm 12 between $p_1(t_1)$ and $p_1(t_2)$, and $p_1(t_2)$ and $p_1(t_3)$, are characterized as $p_{1,i}$ for $i=1-10$.

Figures 4, 5:
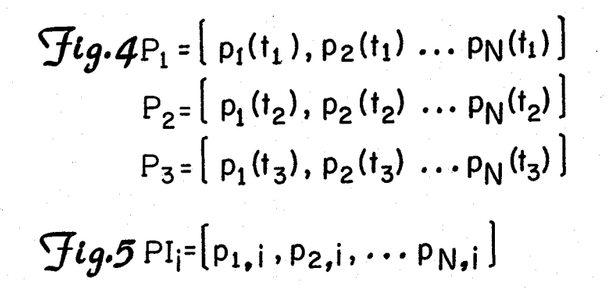
FIG. 4 is an illustration of the convention by which positions along the path illustrated in FIG. 2 are characterized by ensembles of positions about the N axes.
FIG. 5 is an illustration of the convention by which intermediate positions along the path illustrated in FIG. 2 are characterized by ensembles of positions on each of the N axes.

Again utilizing this convention, intermediate positions $PI_i$ can be described by an ensemble of position values $p_{1,i}-p_{N,i}$ representative of the position of robot arm 12 on each of the N axes, as illustrated for example in FIG. 5. $I=10$ intermediate positions $p_{1,i}$ of arm 12 between positions $p_1(t_1)$ and $p_1(t_2)$, and between $p_1(t_2)$ and $p_1(t_3)$, are illustrated in FIG. 6.

In one embodiment of the present invention, functions characterizing path sections 22A-22B are known. For applications of this type data representative of all polynomial coefficients $a_{n,m}$ for each of the M orders of the polynomial equations for each of the N axes is known, and input to computer 18 through terminal 20. In other embodiments, computer 18 computes all polynomial coefficients $a_{n,m}$ as a function of initial condition data describing position and motion characteristics of robot arm 12. Consequently, computer 18 must receive input data through terminal 20 to make these computations.

Input data utilized by computer 18 to compute polynomial coefficients $a_{n,m}$ for the equations characterizing path section 22A includes data representative of positions $P_1$ and $P_2$. This data is preferably received in terms of the first position $p_n(t_1)$ and the second position $p_n(t_2)$ of robot arm 12 on each of the N axes. For each path section 22A-22B, data representative of independent variable t at the first and second positions, such as values of $t_1$ and $t_2$, or the interval $(t_2-t_1)$, and data representative of the number, I, of subintervals $\Delta t_i$, is also required by computer 18.

Computer 18 must also receive data representative of at least M minus one $(M-1)$ derivatives of the polynomial equations describing each of the N axes at first and second positions $p_n(t_1)$ and $p_n(t_2)$, respectively. This input data is sufficient to characterize at least M plus 1 $(M+1)$ initial condition values of the position and motion of robot arm 12 along each of the N axes. Polynomial coefficients $a_{n,m}$ for each order M of each of the N axes can then be computed by simultaneously solving, for each axis, a set of at least $M+1$ one equations describing one of the $M+1$ initial condition values in terms of the polynomial coefficients. Computations of this type are well known, and computer 18 can easily be programmed by those skilled in the art to perform these operations.

Figure 3:
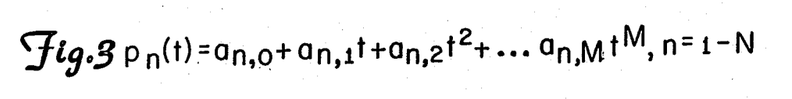
FIG. 3 is a generalized mathematical representation of an M-order polynomial equation describing the motion of the robot arm about each of the N axes of movement.

Rather than computing intermediate positions $p_{n,i}$ for each of the N axes using the polynomial equations described generally in FIG. 3, computer 18 utilizes an iterative algorithm which requires only M additions to compute approximated intermediate positions $p_{n,i}$. Computing time can thereby be greatly reduced. Using the algorithm described, computer 18 computes these approximated intermediate positions as a function of data representative of an immediately preceding position, and difference values $Dm_{n,i}$ which represent an average value of continuous derivatives over subintervals $\Delta t_i$. For each of the N axes, all I intermediate positions $p_{n,i}$ are found by repetitively evaluating the equations described in FIG. 7.

Figure 7:
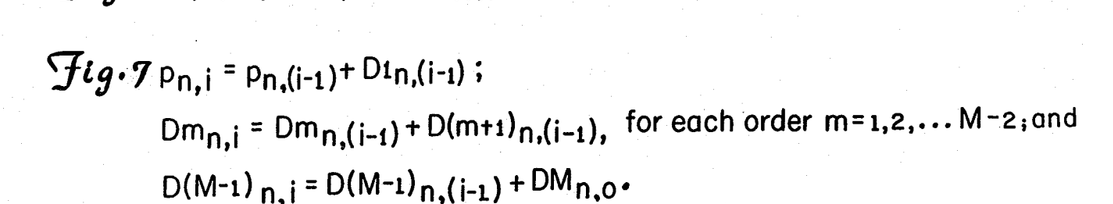
FIG. 7 is a generalized mathematical representation of iterative equations which are recursively evaluated to determine intermediate positions about each of the N axes.
Figure 8:
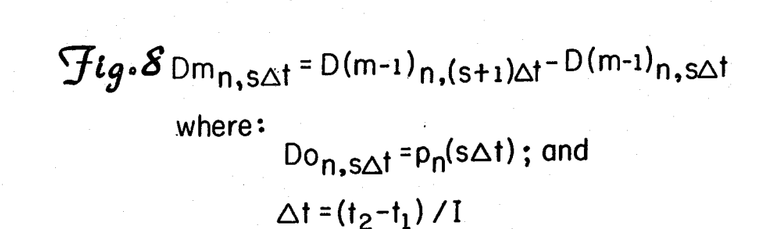
FIG. 8 is a generalized mathematical representation of equations which are recursively evaluated to determine initial difference values utilized by the equations described in FIG. 7.
Figure 9:
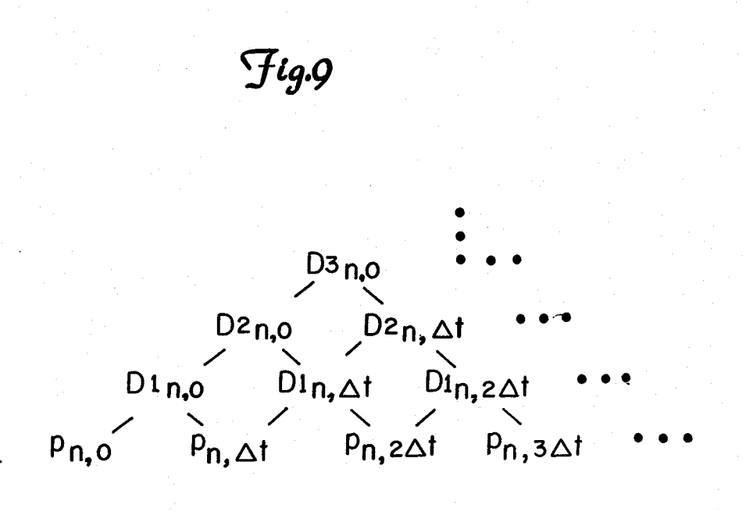
FIG. 9 is a graphic example of a "tree" structure which visually illustrates the equations shown in FIG. 8.

To evaluate the equations described in FIG. 7, it is first necessary to compute initial difference values $Dm_{n,0}$ for each of the M orders of the equations describing each of the N axes. Initial difference values $Dm_{n,0}$ approximate an average value of the derivatives of the polynomial equations over a first subinterval $\Delta t_1$. Initial difference values $Dm_{n,0}$ can be determined and evaluated by computer 18 in terms of the polynomial coefficients by recursively evaluating the equation described in FIG. 8. The "tree" structure illustrated in FIG. 9 can be used as an aid to visualize this recursive evaluation. For example, $D2_{n,0}=D1_{n,\Delta t}-D1_{n,0}$, while $D1_{n,\Delta t}=p_{n,2\Delta t}-p_{n,\Delta t}$, and $D1_{n,0}=p_{n,\Delta t}-p_{n,0}$.

Figure 10:
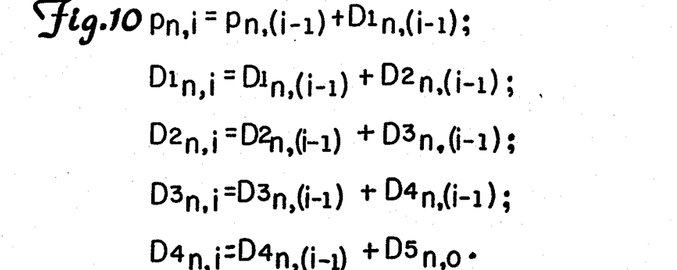
FIG. 10 is a representation of the equations shown in FIG. 7 for use with fifth-order polynomial equations.
Figure 11:
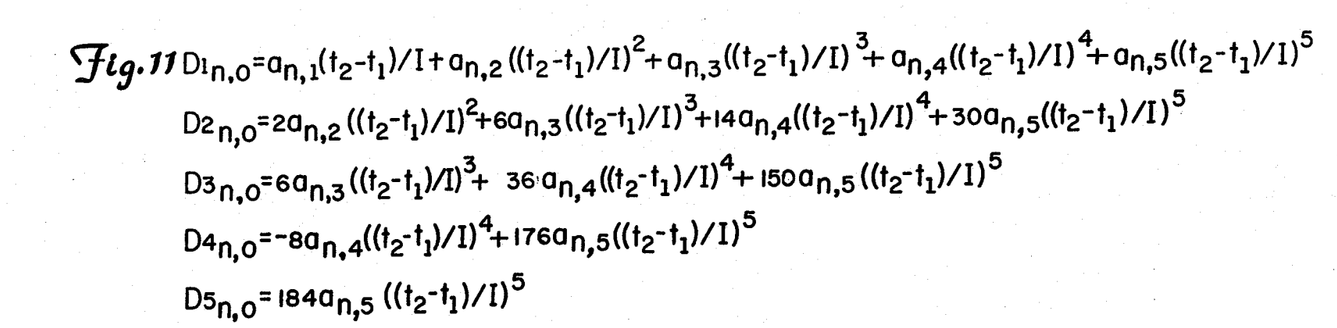
FIG. 11 is a representation of the equations shown in FIG. 8 for use with fifth-order polynomial equations.

When the motion of robot arm 12 can be described by fifth-order polynomial equations $(M=5)$, the equations described in FIG. 7 which must be repetitively evaluated to determine intermediate positions $p_{n,i}$ can be reduced to the equations described in FIG. 10. The equations described in FIG. 8 which are evaluated to determine the initial difference values $Dm_{n,0}$ can be reduced to the equations illustrated in FIG. 11 for applications in which the motion of robot arm 12 can be characterized by fifth-order polynomial equations. Polynomial equations of a lower order (e.g., $M<5$) are simply a specific case of the fifth-order equations in which polynomial coefficients $a_{n,M+1}-a_{n,5}$ are set equal to zero.

Using the procedures described above, computer 18 (FIG. 1) can efficiently compute data representative of intermediate positions $PI_i$. Beginning from position $P_1$ for example (FIG. 2), computer 18 will first generate data representative of a first intermediate position $p_{n,1}$ for each of the $N=3$ axes of motion. This data is provided to axis servo controllers 16A-16N, respectively. Servo controllers 16A-16N, in turn, produce servo control signals which cause actuators 14A-14N to linearly drive robot arm 12 to first intermediate position $PI_1$. These procedures are then repeated so as to continually drive robot arm 12 through all I intermediate positions until second position $P_2$ is reached.

Robot arm 12 can be driven through position $P_2$ to position $P_3$ along second path section 22B in an identical manner. In this way, robot arm 12 can be driven along a path such as 22 which is comprised of sections characterized by individual spline functions. Continuity between the individual spline functions describing each path section can be produced if the derivatives characterizing the spline functions are equal to one another at the positions of intersection, i.e. $P_2$ in FIG. 2. For those applications in which polynomial coefficients $a_{n,m}$ must be computed for the equations describing the N axes of path section 22B, computer 18 will require at least $M+1$ initial condition values to make these calculations, as previously described for path section 22A. These initial condition values can be taken from a set of values including element positions on each of the N-axes at variable $t=t_2$ and $t_3$, and data representative of derivatives (e.g., velocity and acceleration) of the equations at the second and third positions. Data representative of the second position and derivatives of the equations at this point are known, or can be computed by computer 18 utilizing the equations describing path section 22A. It may, however, be necessary to select the value of some derivatives at the third positions.

Figure 12:
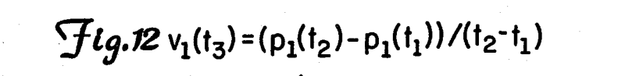
FIG. 12 is a representation of an equation used to calculate an average velocity over a previous path section for use as an ending velocity during a next subsequent path section.

For each of the N axes, ending velocity or other characteristics of motion of robot arm 12 for each sequential or next path section such as 22B, as described by derivatives of the equations representative thereof at $t=t_3$, can be determined in one of several ways. One option is to set the derivatives at the end of the subsequent path section such as 22B equal to the average of the derivative over the previous path section such as 22A. For example, the first derivative, or velocity, of robot arm 12 on the first axis at $t=t_3$ for path section 22B can be determined in accordance with the equation described in FIG. 12. This method tends to produce overshoot.

Figure 13:
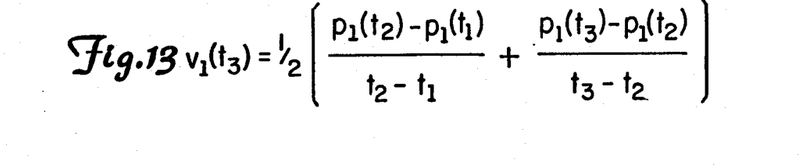
FIG. 13 is an equation used to calculate an average velocity over two sequential path sections for use as an ending velocity for a second of the sequential sections.

Alternatively, the derivatives at the end of path section 22B can be set equal to the average of the derivatives over previous path section 22A, and path section 22B. The equation for computing the first derivative, or velocity, of robot arm 12 on the first axis, $v_1(t_3)$, in accordance with this alternative is illustrated in FIG. 13. This method produces less overshoot than that described immediately above, but requires more calculations. The choice will depend upon the particular application to which the invention is being adapted.

Figure 14:
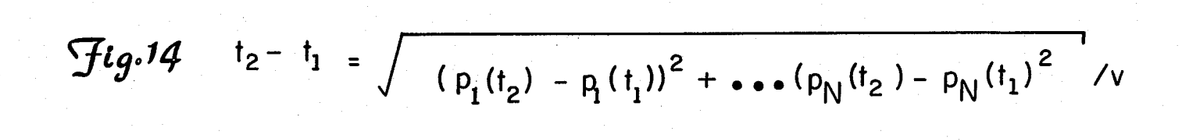
FIG. 14 is a representation of an equation used to calculate the time interval between first and second positions when it is desired to drive the robot arm between these positions at a constant velocity.
Figure 15:
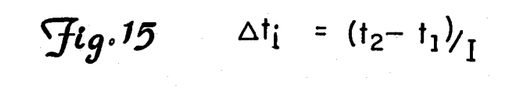
FIG. 15 is a representation of an equation relating the duration of the path subintervals shown in FIG. 2 to a ratio of the difference of the independent variables at the first and second position to a number of desired subintervals.

In some applications it is also desirable to control the speed of robot arm 12 along path sections 22A and 22B. In applications of this type, independent variable t is used to represent time, and the time interval $t_2 - t_1$ (for path section 22A) is determined as a function of the distance to be traveled and the desired velocity v. This time interval can be computed using the equation illustrated in FIG. 14. Alternatively, the number I of subintervals $\Delta t_i$ can be specified using the relation described in FIG. 15. Again, the choice depends upon the particular application to which the invention is being put.

In conclusion, the present invention is a computerized machine tool which utilizes an iterative algorithm to efficiently generate data representative of a desired program of movements. Those skilled in the art can easily program a computer to implement the equations described above.

Although the present invention has been described with reference to preferred embodiments, workers skilled in the art will recognize that changes may be made in form and detail without departing from the spirit and scope of the invention.

I claim:

1. Apparatus for driving a movable element in space about N axes of movement, as a function of an independent variable t having a first value $t_1$ and a second value $t_2$, between a first position $P_1$ and a second position $P_2$ along a first path section represented in parametric form as a function of the independent variable t by a first set of M-order polynomial equations $p_n(t)=a_{n,0}+a_{n,1}t+a_{n,2}t^2+\ldots a_{n,M}t^M$ for each axis $n=1\ldots N$ by computing I intermediate positions $PI_i=[p_{1,i}, p_{2,i}, \ldots p_{N,i}]$ for each $i=1, 2, \ldots I$, separated by subintervals $\Delta t$ and approximating positions along the path intermediate the first position $p_1=[p_1(t_1), p_2(t_1), \ldots p_N(t_1)]$ and the second position $P_2=[p_1(t_2), p_2(t_2), \ldots p_N(t_2)]$ during an interval $t_1 \leq t \leq t_2$, and moving the element from the first position through the intermediate positions to the second position comprising:

input means for receiving:
data representative of the first position, $p_n(t_1)$, and the second position, $p_n(t_2)$, of the element on each of the N axes;
data representative of at least $M-1$ derivatives of the polynomial equations for each of the N axes at the first and second element positions, the data representative of the at least $M-1$ derivatives and the first and second positions characterizing at least $M+1$ initial condition values of element position and motion along each axis;
data representative of the interval $(t_2-t_1)$; and
data representative of the number, I, of intermediate positions $PI_i$;

computer means responsive to the input means for computing and producing signals representative of:
polynomial coefficients $a_{n,0}, a_{n,1}, a_{n,2}, \ldots a_{n,M}$ for each of the N axes by simultaneously solving, for each axis, a set of at least $M+1$ equations describing one of the at least $M+1$ initial condition values in terms of the polynomial coefficients;
initial difference values $Dm_{n,0}$ for each of the M orders of each of the N axes, the difference values approximating an average value of the derivatives of the polynomial equations over a first subinterval $\Delta t$, wherein the difference values $Dm_{n,0}$ can be determined and evaluated in terms of the polynomial coefficients by recursively evaluating an equation:

$$Dm_{n,s\Delta t}=D(m-1)_{n,(s+1)\Delta t}-D(m-1)_{n,s\Delta t},$$

where:
s is a number;

$$DO_{n,s\Delta t}=p_n(s\Delta t); \text{ and } \Delta t=(t_2-t_1)/I;$$

first position $P_1$ and second position $P_2$; and
intermediate positions $PI_i$ where for each of the N axes;

$$p_{n,i}=p_{n,(i-1)}+Dl_{n,(i-1)};$$
$$Dm_{n,i}=Dm_{n,(i-1)}+D(m+1)_{n,(i-1)} \text{ for each order}$$
$$m=1, 2, \ldots M-2; \text{ and}$$

$$D(M-1)_{n,i}=D(M-1)_{n,(i-1)}+DM_{n,0}; \text{ and}$$

actuator means responsive to the computer means for continuously moving the element from the first position, through the intermediate positions, and to the second position, as a function of the signals representative thereof.

2. The apparatus of claim 1 wherein the independent variable t has a third value $t_3$ and the apparatus drives the movable element to a third position $P_3$ along a second path section represented in parametric form by a second set of polynomial equations by computing I intermediate postions $PI_i$ along the second path section, and moving the element from the second position through the intermediate positions along the second path section to the third position, and wherein:

the input means receives:
data representative of the third position $p_n(t_3)$ of the element on each of the N axes;
data representative of an interval $(t_3-t_2)$; and
data representative of the number, I, of intermediate positions along the second path section;

the computer means computes and produces signals representative of:
second position $P_2$ and third position $P_3$;
data representative of at least $M-1$ derivatives of the polynomial equations of the second set for each of the N axes at the second and third element positions, the data representative of the at least $M-1$ derivatives and the second and third positions characterizing at least $M+1$ initial condition values of element position and motion on each axis along the second path section;
polynomial coefficients $a_{n,o}, a_{n,1}, \ldots a_{n,M}$ for each of the N axes by simultaneously solving, for each axis, a set of at least $M+1$ equations describing one of the least M+1 initial condition values in terms of the polynomial coefficients; and initial difference values $Dm_{n,0}$ for each of the M orders of each of the N axes; and the actuator means moves the element from the second position, through the intermediate positions, and to the third position.

3. The apparatus of claim 2 wherein the computer means computes data representative of at least some of the M−1 derivatives of the polynomial equations of the second set as a function of an average of the derivative in the first path section.

4. The apparatus of claim 2 wherein the computer means computes data representative of at least some of the M−1 derivatives of the polynomial equations of the second set as a function of an average of the derivative over the first and second path sections.

5. The apparatus of claim 1 wherein the independent variable represents time.

6. The apparatus of claim 1 wherein the independent variable represents path length.

7. Apparatus for driving a movable element in space about N axes of movement, as a function of an independent variable t having a first value $t_1$ and a second value $t_2$, between a first position $P_1$ and a second position $P_2$ along a first path section described in parametric form as a function of the independent variable t by a 5th-order polynomial equation of the form $p_n(t)=a_{n,0}+a_{n,1}t+a_{n,2}t^2+a_{n,3}t^3+a_{n,4}t^4+a_{n,5}t^5$ for each axis $n=1\ldots N$ by computing I intermediate positions $PI_i=[p_{1,i} p_{2,i}\ldots p_{N,i}]$ for each $i=1, 2, \ldots I$, separated by subintervals $\Delta t$ and approximating positions on the path intermediate the first position $p_1=[p_1(t_1), p_2(t_1), \ldots p_N(t_1)]$, and the second position $P_2=[p_1(t_2), p_2(t_2) \ldots p_N(t_2)]$ during an interval $t_1 \leq t \leq t_2$, and moving the element through the first, intermediate, and second positions, comprising:

input means for receiving:
  data representative of the initial position, $p_n(t_1)$, and the final position, $p_n(t_2)$, of the element on each of the N axes;
  data representative of at least four derivatives of the polynomial equations for each of the N axes at the first and second element positions, the data representative of the at least four derivatives and the first and second positions characterizing at least six initial condition values of the element position and motion along each axis;
  data representative of the interval $(t_2-t_1)$; and
  data representative of the number, I, of intermediate positions $PI_i$;

computer means for computing and producing signals representative of:
  polynomial coefficients $a_{n,0}$, $a_{n,1}$, $a_{n,2}$, $a_{n,3}$, $a_{n,4}$, and $a_{n,5}$ for each of the N axes by simultaneously solving, for each axis, a set of at least six equations decribing one of the at least six initial condition values in terms of the polynomial coefficients; and
  initial difference values $D1_{n,0}$ $D2_{n,0}$, $D3_{n,0}$, $D4_{n,0}$, and $D5_{n,0}$ for each of the N axes where:

$D1_{n,0}=a_{n,1}((t_2-t_1)/I)+a_{n,2}((t_2-t_1)/I)^2+a_{n,3}((t_2-t_1)/I)^3+a_{n,4}((t_2-t_1)/I)^4+a_{n,5}((t_2-t_1)/I)^5$;

$D2_{n,0}=2a_{n,2}((t_2-t_1)/I)^2+6a_{n,3}((t_2-t_1)/I)^3+14a_{n,4}((t_2-t_1)/I)^4+30a_{n,5}((t_2-t_1)/I)^5$;

$D3_{n,0}=6a_{n,3}((t_2-t_1)/I)^3+36a_{n,4}((t_2-t_1)/I)^4+150a_{n,5}((t_2-t_1)/I)^5$;

$D4_{n,0}=-8a_{n,4}((t_2-t_1)/I)^4+176a_{n,5}((t_2-t_1)/I)^5$; and $D5_{n,0}=184a_{n,5}((t_2-t_1)/I)^5$; and intermediate positions $PI_i$ for $i=1, 2, \ldots I$, where for each of the N axes;

$p_{n,i}=p_{n,(i-1)}+D1_{n,(i-1)}$;

$D1_{n,i}=D1_{n,(i-1)}+D2_{n,(i-1)}$;

$D2_{n,i}=D2_{n,(i-1)}+D3_{n,(i-1)}$;

$D3_{n,i}=D3_{n,(i-1)}+D4_{n,(i-1)}$; and $D4_{n,i}=D4_{n,(i-1)}+D5_{n,0}$; and actuator means responsive to the computer means for progressively moving the element through the first, intermediate, and second positions, as a function of the signals representative thereof.

8. The apparatus of claim 7 wherein the independent variable t has a third value $t_3$ and the apparatus drives the movable element to a third position $P_3$ along a second path section represented in parametric form by a second set of polynomial equations by computing I intermediate positions $PI_i$ along the second path section and moving the element from the second position through the intermediate positions along the second path section to the third position, and wherein:

the input means receives:
  data representative of the third position $p_n(t_3)$ of the element on each of the N axes;
  data representative of an interval $(t_3-t_2)$; and
  data representative of the number, I, of intermediate positions along the second path section;

the computer means computes and produces signals representative of:
  second position $P_2$ and third position $P_3$;
  data representative of at least four derivatives of the polynomial equations of the second set for each of the N axes at the second and third element positions, the data representative of the at least four derivatives and the second and third positions characterizing at least six initial condition values of element position and motion on each axis along the second path sections;
  polynomial coefficients $a_{n,0} \ldots a_{n,5}$ for each of the N axes by simultaneously solving, for each axis, a set of at least six equations describing one of the at least six initial condition values in terms of the polynomial coefficients; and initial difference values $D1_{n,0}-D5_{n,0}$ for each of the N axes; and intermediate positions $PI_i$; and the actuator means moves the element from the second position, through the intermediate positions, to the third position.

9. The apparatus of claim 8 wherein the computer means computes data representative of at least some of the four derivatives of the polynomial equations of the second set at the third position as a function of an average of the derivative in the first path section.

10. The apparatus of claim 8 wherein the computer means computes data representative of at least some of the four derivatives of the polynomial equations of the second set at the third position as a function of an average of the derivative over the first and second path sections.

11. The apparatus of claim 7 wherein the independent variable represents time.

12. The apparatus of claim 7 wherein the independent variable represents path length.

13. Apparatus for driving a movable element in space about N axes of movement, as a function of an independent variable t having a first value $t_1$ and a second value $t_2$, between a first position $P_1$ and a second position $P_2$ along a first path section represented in parametric forms as a function of the independent variable t by a first set of M-order polynomial equations $p_n(t) = a_{n,0} + a_{n,1}t + a_{n,2}t^2 + \ldots a_{n,M}t^M$ for each axis $n = 1 \ldots N$ by computing I intermediate positions $PI_i = [p_{1,i}, p_{2,i}, \ldots p_{N,i}]$ for each $i = 1, 2, \ldots I$, separated by subintervals $\Delta t$ and approximating positions along the path intermediate the first position $P_1 = [p_1(t_1), p_2(t_1), \ldots p_N(t_1)]$ and $P_2 = [p_1(t_2), p_2(t_2), \ldots p_N(t_2)]$ during an interval $t_1 \leq t \leq t_2$), and moving the element from the first position through the intermediate positions to the second position, comprising:

input means for receiving:
data representative of the first position, $p_n(t_1)$, and the second position, $p_n(t_2)$, of the element on each of the N axes;
polynomial coefficients $a_{n,0}, a_{n,1}, \ldots a_{n,M}$ for each of the N axes;
data representative of the interval $(t_2 - t_1)$; and
data representative of the number, I, of intermediate positions $PI_i$;

computer means responsive to the input means for computing and producing signals representative of:
initial difference values $Dm_{n,0}$ for each of the M orders of each of the N axes, the difference values approximating an average value of the derivatives of the polynomial equations over a first subinterval $\Delta t$, wherein the difference values $Dm_{n,0}$ can be determined and evaluated in terms of the polynomial coefficients by recursively evaluating an equation:

$$Dm_{n,s\Delta t} = D(m-1)_{n,(s+1)\Delta t} - D(m-1)_{n,s\Delta t},$$

where:
s is a number;

$DO_{n,s\Delta t} = p_n(s\Delta t)$; and $\Delta t = (t_2 - t_1)/I$;

first position $P_1$ and second position $P_2$; and
intermediate positions $PI_i$; where for each of the N axes:

$p_{n,i} = p_{n,(i-1)} + D1_{n,(i-1)}$;

$Dm_{n,i} = Dm_{n,(i-1)} + D(m+1)_{n,(i-1)}$ for each order $m = 1, 2, \ldots M-2$; and $D(M-1)_{n,i} = D(M-1)_{n,(i-1)} + DM_{n,0}$; and actuator means responsive to the computer means for progressively moving the element through the first, intermediate, and second positions, as a function of the signals representative thereof.

14. The apparatus of claim 13 wherein the independent variable t has a third value $t_3$, and the apparatus drives the movable element to a third position $P_3$ along a second path section represented in parametric form by a second set of polynomial equations by computing I intermediate positions $PI_i$ along the second path section, and moving the element from the second position through the intermediate positions along the second path section to the third position, and wherein:

the input means receives:
data representative of the third position $p_n(t_3)$ of the element on each of the N axes;
data representative of polynomial coefficients $a_{n,0}, \ldots a_{n,M}$ for each of the N axes;
data representative of an interval $(t_3 - t_2)$; and
data representative of the number, I, of intermediate positions along the second path section;

the computer means computes and produces signals representative of:
second position $P_2$ and third position $P_3$; and
initial difference values $Dm_{n,0}$ for each of the M orders of each of the N axes; and
intermediate positions $PI_i$; and the actuator means moves the element from the second position, through the intermediate positions, and to the third position.

15. The apparatus of claim 14 wherein the independent variable represents time.

16. The apparatus of claim 14 wherein the independent variable represents path length.

17. Apparatus for driving a movable element in space about N axes of movement, as a function of an independent variable t having a first value $t_1$ and a second value $t_2$, between a first position $P_1$ and a second position $P_2$ along a first path section represented in parametric form as a function of the independent variable t by a first set of fifth-order polynomial equations $p_n(t) = a_{n,0} + a_{n,1}t + a_{n,2}t^2 + \ldots a_{n,5}t^5$ for each axis $n = 1 \ldots N$ by computing I intermediate positions $PI_i = [p_{1,i}, p_{2,i}, \ldots p_{N,i}]$ for each $i = 1, 2, \ldots I$, separated by subintervals $\Delta t$ and approximating positions along the path intermediate the first position $P_1 = [p_1(t_1), p_2(t_1), \ldots p_N(t_1)]$ and $P_2 = [p_1(t_2), p_2(t_2), \ldots p_N(t_2)]$ during an interval $t_1 \leq t \leq t_2$, and moving the element from the first position through the intermediat positions to the second position, comprising:

input means for receiving:
data representative of the first position, $p_n(t_1)$, and the second position, $p_n(t_2)$, of the element on each of the N axes;
data representative of polynomial coefficients $a_{n,0} \ldots a_{n,5}$ for each of the N axes;
data representative of the interval $(t_2 - t_1)$; and
data representative of the number, I, of intermediate positions $PI_i$;

computer means for computing and producing signals representative of:
initial difference values $D1_{n,0}$ $D2_{n,0}$, $D3_{n,0}$, $D4_{n,0}$, and $D5_{n,0}$ for each of the N axes where:

$D1_{n,0} = a_{n,1}((t_2-t_1)/I) + a_{n,2}((t_2-t_1)/I)^2$
$+ a_{n,3}((t_2-t_1)/I)^3$
$+ a_{n,4}((t_2-t_1)/I)^4 + a_{n,5}((t_2-t_1)/I)^5$;

$D2_{n,0} = 2a_{n,2}((t_2-t_1)/I)^2 + 6a_{n,3}((t_2-t_1)/I)^3$
$+ 14a_{n,4}((t_2-t_1)/I^4 + 30a_{n,5}((t_2-t_1)/I)^5$;

$D3_{n,0} = 6a_{n,3}((t_2-t_1)/I)^3 + 36a_{n,4}((t_2-t_1)/I)^4$
$+ 150a_{n,5}((t_2-t_1)/I)^5$;

$D4_{n,0} = -8a_{n,4}((t_2-t_1)/I)^4 + 176a_{n,5}((t_2-t_1)/I)^5$;
and $D5_{n,0} = 184a_{n,5}((t_2-t_1)/I)^5$; and intermediate positions $PI_i$ for $i = 1, 2, \ldots I$, where for each of the N axes:

$p_{n,i} = p_{n,(i-1)} + D1_{n,(i-1)}$;

$D1_{n,i} = D1_{n,(i-1)} + D2_{n,(i-1)}$;

$D2_{n,i} = D2_{n,(i-1)} + D3_{n,(i-1)}$;

$D3_{n,i} = D3_{n(i-1)} + D4_{n,(i-1)}$; and $D4_{n,i} = D4_{n,(i-1)} + D5_{n,0}$; and actuator means responsive to the computer means for progressively moving the element through the first, intermediate, and second positions, as a function of the signals representative thereof.

18. The apparatus of claim 17 wherein the independent variable t has a third value $t_3$ and the apparatus drives the movable element to a third position $P_3$ along a second path section represented in parametric form by a second set of fifth-order polynomial equations by computing I intermediate positions $PI_i$ along the second path section, and moving the element from the second position through the intermediate positions along the second path section to the third position, and wherein: the input means receives:
data representative of the third position $p_n(t_3)$ of the element on each of the N axes;
data representative of polynomial coefficients $a_{n,1} \ldots a_{n,5}$ for each of the N axes;
data representative of an interval $(t_3 - t_2)$; and
data representative of the number, I, of intermediate positions along the second path section;
the computer means computes and produces signals representative of:
second position $P_2$ and third position $P_3$;
initial difference values $Dm_{n,0}$ for each of the M orders of each of the N axes; and
intermediate positions $PI_i$; and
the actuator means moves the element from the second position, through the intermediate positions, and to the third position.

19. The apparatus of claim 17 wherein the independent variable represents time.

20. The apparatus of claim 17 wherein the independent variable represents path length.

21. A method for operating a digital computer and controlling the motion of a movable element being driven in space about N axes of movement, as a function of an independent variable t having a first value $t_1$ and a second value $t_2$, between a first position $P_1$ and a second position $P_2$ along a first path section represented in parametric form as a function of the independent variable t by a first set of M-order polynomial equations $p_n(t) = a_{n,0} + a_{n,1}t + a_{n,2}t^2 + \ldots a_{n,M}t^M$ for each axis $n = 1 \ldots N$ by computing I intermediate positions $PI_i = [p_{1,i}, p_{2,i} \ldots p_{N,i}]$ for each $i = 1, 2, \ldots I$, separated by subintervals $\Delta t$ and approximating positions along the path intermediate the first position $P_1 = [p_1(t_1), p_2(t_1), \ldots p_N(t_1)]$, and the second position $P_2 = [p_1(t_2), p_2(t_2), \ldots p_N(t_2)]$ during an interval $t_1 \leq t \leq t_2$, comprising:
inputting data representative of the first position, $p_n(t_1)$, and the second position, $p_n(t_2)$, of the element on each of the N axes;
inputting data representative of at least $M-1$ derivatives of the polynomial equations for each of the N axes at the first and second element positions, the data representative of the at least $M-1$ derivatives and the first and second positions characterizing at least $M+1$ initial condition values of element position and motion along each axis;
inputting data representative of the interval $(t_2 - t_1)$;
inputting data representative of the number, I, of intermediate positions $PI_i$;
computing data representative of polynomial coefficients $a_{n,0}, a_{n,1}, a_{n,2}, \ldots a_{n,M}$ for each of the N axes by simultaneously solving, for each axis, a set of at least $M+1$ equations describing one of the at least $M+1$ initial condition values in terms of the polynomial coefficients;
computing data representative of initial difference values $Dm_{n,0}$ for each of the M orders of each of the N axes, the difference values approximating an average value of the derivatives of the polynomial equations over a first subinterval $\Delta t$, wherein the difference values $Dm_{n,0}$ can be determined and evaluated in terms of the polynomial coefficients by recursively evaluating an equation:

$Dm_{n,s\Delta t} = D(m-1)_{n,(s+1)\Delta t} - D(m-1)_{n,s\Delta t}$, where:
s is a number;

$D0_{n,s\Delta t} = p_n(s\Delta t)$; and $\Delta t = (t_2 - t_1)/I$;

computing data representative of first position $P_1$ and second position $P_2$;
computing data representative of intermediate positions $PI_i$ where for each of the N axes:

$p_{n,i} = p_{n,(i-1)} + D1_{n,(i-1)}$;
$Dm_{n,i} = Dm_{n,(i-1)} + D(m+1)_{n,(i-1)}$ for each order $m = 1, 2, \ldots M-2$; and $D(M-1)_{n,i} = D(M-1)_{n,(i-1)} + DM_{n,0}$; and driving the element between the first and second positions through the intermediate positions as a function of the data representative thereof.

22. The method of claim 21 wherein the independent variable represents time.

23. A method for operating a digital computer and controlling the motion of a movable element being driven in space about N axes of movement, as a function of an independent variable t having a first value $t_1$ and a second value $t_2$, between a first position $P_1$ and a second position $P_2$ along a first path section described in parametric form as a function of the independent variable t by a 5th-order polynomial equation of the form $p_n(t) = a_{n,0} + a_{n,1}t + a_{n,2}t^2 + a_{n,3}t^3 + a_{n,4}t^4 + a_{n,5}t^5$ for each axis $n = 1 \ldots N$ by computing I intermediate positions $PI_i = [p_{1,i} p_{2,i} \ldots p_{N,i}]$ for each $i = 1, 2, \ldots I$, separated by subintervals $\Delta t$ and approximating positions on the path intermediate the first position $P_1 = [p_1(t_1), p_2(t_1), \ldots p_N(t_1)]$, and the second position $P_2 = [p_1(t_2), p_2(t_2), \ldots p_N(t_2)]$ during an interval $t_1 \leq t \leq t_2$, comprising:
inputting data representative of the initial position, $p_n(t_1)$, and the final position, $p_n(t_2)$, of the element on each of the N axes;
inputting data representative of at least four derivatives of the polynomial equations for each of the N axes at the first and second element positions, the data representative of the at least four derivatives and the first and second positions characterizing at least six initial condition values of the element position and motion along each axis;
inputting data representative of the interval $(t_2-t_1)$; and
inputting data representative of the number, I, of intermediate positions $PI_i$;
computing data representative of polynomial coefficients $a_{n,0}, a_{n,1}, a_{n,2}, a_{n,3}, a_{n,4}$, and $a_{n,5}$ for each of the N axes by simultaneously solving, for each axis, a set of at least six equations describing one of the at least six initial condition values in terms of the polynomial coefficients;
computing data representative of initial difference values $D1_{n,0}, D2_{n,0}, D3_{n,0}, D4_{n,0}$, and $D5_{n,0}$ for each of the N axes where:

$$D1_{n,0}=a_{n,1}((t_2-t_1)/I)+a_{n,2}((t_2-t_1)/I)^2 \\ +a_{n,3}((t_2-t_1)/I)^3 \\ +a_{n,4}((t_2-t_1)/I)^4+a_{n,5}((t_2-t_1)/I)^5;$$

$$D2_{n,0}=2a_{n,2}((t_2-t_1)/I)^2+6a_{n,3}((t_2-t_1)/I)^3 \\ +14a_{n,4}((t_2-t_1)/I)^4+a_{n,5}((t_2-t_1)/I)^5;$$

$$D3_{n,0}=6a_{n,3}((t_2-t_1)/I)^3+36a_{n,4}((t_2-t_1)/I)^4+1\text{-}50a_{n,5}((t_2-t_1)/I)^5;$$

$$D4_{n,0}=-8a_{n,4}((t_2-t_1)/I)^4+176a_{n,5}((t_2-t_1)/I)^5;$$
and $$D5_{n,0}=184a_{n,5}((t_2-t_1)/I)^5; \text{ and}$$

computing data representative of intermediate positions $PI_i$ for $i=1, 2, \ldots I$, where for each of the N axes:

$$p_{n,i}=p_{n,(i-1)}+D1_{n,(i-1)};$$

$$D1_{n,i}=D1_{n,(i-1)}+D2_{n,(i-1)};$$

$$D2_{n,i}=D2_{n,(i-1)}+D3_{n,(i-1)};$$

$$D3_{n,i}=D3_{n(i-1)}+D4_{n,(i-1)}; \text{ and}$$

$$D4_{n,i}=D4_{n,(i-1)}+D5_{n,0}; \text{ and}$$

driving the element between the first and second positions through the intermediate positions as a function of the data representative thereof.

24. The method of claim 23 wherein the independent variable represents time.

25. The method of claim 23 wherein the independent variable represents path length.

26. A method for operating a digital computer and controlling the motion of a movable element being driven in space about N axes of movement, as a function of an independent variable t having a first value $t_1$ and a second value $t_2$, between a first position $P_1$ and a second position $P_2$ along a first path section represented in parametric form as a function of the independent variable t by a first set of M-order polynomial equations $p_n(t)=a_{n,0}+a_{n,1}t+a_{n,2}t^2+ \ldots a_{n,M}t^M$ for each axis $n=1 \ldots N$ by computing I intermediate positions $PI_i=[p_{1,i}, p_{2,i}, \ldots p_{N,i}]$ for each $i=1, 2, \ldots I$, separated by subintervals $\Delta t$ and approximating positions along the path intermediate the first position $P_1=[p_1(t_1), p_2(t_1), \ldots p_N(t_1)]$, and a second position $P_2=[p_1(t_2), p_2(t_2), \ldots p_N(t_2)]$ during an interval $t_1 \leq t \leq t_2$, comprising:
inputting data representative of the first position, $p_n(t_1)$, and the second position, $p_n(t_2)$, of the element on each of the N axes;
inputting polynomial coefficients $a_{n,0}, a_{n,1}, \ldots a_{n,M}$ for each of the N axes;
inputting data representative of the interval $(t_2-t_1)$;
inputting data representative of the number, I, of intermediate positions $PI_i$;
computing data representative of initial difference values $Dm_{n,0}$ for each of the M orders of each of the N axes, the difference values approximating an average value of the derivatives of the polynomial equations over a first subinterval $\Delta t$, wherein the difference values $Dm_{n,0}$ can be determined and evaluated in terms of the polynomial coefficients by recursively evaluating an equation:

$$Dm_{n,s\Delta t}=D(m-1)_{n,(s+1)\Delta t}-D(m-1)_{n,s\Delta t}$$

where $$D0_{n,s\Delta t}=p_n(s\Delta t); \text{ and } \Delta t=(t_2-t_1)/I;$$

computing data representative of first position $P_1$ and second position $P_2$;
computing data representative of intermediate positions $PI_i$; where for each of the N axes:

$$p_{n,i}=p_{n,(i-1)}+D1_{n,(i-1)};$$

$$Dm_{n,i}=Dm_{n,(i-1)}+D(m+1)_{n,(i-1)} \text{ for each order } m=1, 2, \ldots M-2; \text{ and}$$

$$D(M-1)_{n,i}=D(M-1)_{n,(i-1)}+DM_{n,0}; \text{ and}$$

driving the element between the first and second positions through the intermediate positions as a function of the data representative thereof.

27. The method of claim 26 wherein the independent variable represents time

28. A method for operating a digital computer and controlling the motion of a movable element being driven in space about N axes of movement, as a function of an independent variable t having a first value $t_1$ and a second value $t_2$, between a first position $P_1$ and a second position $P_2$ along a first path section represented in parametric form as a function of the independent variable t by a first set of fifth-order polynomial equations $p_n(t)=a_{n,0}+a_{n,1}t+a_{n,2}t^2+ \ldots a_{n,5}t^5$ for each axis $n=1 \ldots N$ by computing I intermediate positions $PI_i=[p_{1,i}, p_{2,i}, \ldots p_{N,i}]$ for each $i=1, 2, \ldots I$, separated by subintervals $\Delta t$ and approximating positions along the path intermediate the first position $P_1=[p_1(t_1), p_2(t_1), \ldots p_N(t_1)]$, and a second position $P_2=[p_1(t_2), p_2(t_2), \ldots p_N(t_2)]$ during an interval $t_1 \leq t \leq t_2$, comprising:
inputting data representative of the first position, $p_n(t_1)$, and the second position, $p_n(t_2)$, of the element on each of the N axes;
inputting data representative of polynomial coefficients $a_{n,0} \ldots a_{n,5}$ for each of the N axes;
inputting data representative of the interval $(t_2-t_1)$;
inputting data representative of the number, I, of intermediate positions $PI_i$;
computing date represenative of initial difference values $D1_{n,0}, D2_{n,0}, D3_{n,0}, D4_{n,0}$, and $D5_{n,0}$ for each of the N axes where:

$$D1_{n,0}=a_{n,1}((t_2-t_1)/I)+a_{n,2}((t_2-t_1)/I)^2 \\ +a_{n,3}((t_2-t_1)/I)^3 \\ +a_{n,4}((t_2-t_1)/I)^4+a_{n,5}((t_2-t_1)/I)^5;$$

$$D2_{n,0}=2a_{n,2}((t_2-t_1)/I)^2+6a_{n,3}((t_2-t_1)/I)^3 \\ +14a_{n,4}((t_2-t_1)/I)^4+30a_{n,5}((t_2-t_1)/I)^5;$$

$$D3_{n,0} = 6a_{n,3}((t_2-t_1)/I)^3 + 36a_{n,4}((t_2-t_1)/I)^4 + 150a_{n,5}((t_2-t_1)/I)^5;$$

$$D4_{n,0} = -8a_{n,4}((t_2-t_1)/I)^4 + 176a_{n,5}((t_2-t_1)/I)^5;$$
and $$D5_{n,0} = 184a_{n,5}((t_2-t_1)/I)^5;$$

computing data representative of intermediate positions $PI_i$ for $i = 1, 2, \ldots I$, where for each of the N axes:

$$p_{n,i} = p_{n,(i-1)} + D1_{n,(i-1)};$$

$$D1_{n,i} = D1_{n,(i-1)} + D2_{n,(i-1)};$$

$$D2_{n,i} = D2_{n,(i-1)} + D3_{n,(i-1)};$$

$$D3_{n,i} = D3_{n,(i-1)} + D4_{n,(i-1)}; \text{ and}$$

$$D4_{n,i} = D4_{n,(i-1)} + D5_{n,0}; \text{ and}$$

driving the element between the first and second positions through the intermediate positions as a function of data representative thereof.

29. The method of claim 28 wherein the independent variable represents time.

30. The method of claim 29 wherein the independent variable represents path length.

* * * * *

UNITED STATES PATENT AND TRADEMARK OFFICE
CERTIFICATE OF CORRECTION

PATENT NO. : 4,794,540

DATED : December 27, 1988

INVENTOR(S) : Yevsey Gutman et al.

It is certified that error appears in the above-identified patent and that said Letters Patent is hereby corrected as shown below:

Col. 7, Line 39, delete "I", and insert --we--.

Col. 7, Line 46 (at end of line), delete "1-".

Col. 7, Line 47 (at beginning of line), delete "t", and insert --$1^t$--.

Col. 8, Line 28, After "axes", delete the semicolon, and insert a colon.

Col. 9, Line 28 (at end of line), delete "1-".

Col. 9, Line 29 (at beginning of line), delete "t", and insert --$1^t$--.

Col. 9, Line 56, delete "decribing", and insert --describing--.

Col. 11, Line 16, delete "forms", and insert --form--.

Col. 11, Line 17 (at end of line), delete "-".

UNITED STATES PATENT AND TRADEMARK OFFICE
CERTIFICATE OF CORRECTION

PATENT NO. : 4,794,540

DATED : December 27, 1988

INVENTOR(S) : Yevsey Gutman et al.

It is certified that error appears in the above-identified patent and that said Letters Patent is hereby corrected as shown below:

Col. 11, Line 18 (at beginning of line), delete "o", and insert --$_o$--.

Col. 12, Line 34 (at end of line), delete "1-".

Col. 12, Line 35 (at beginning of line), delete "t", and insert --$1^t$--.

Col. 12, Line 42, delete "intermediat", and insert --intermediate--.

Col. 14, Line 48, delete "cntrolling", and insert --controlling--.

UNITED STATES PATENT AND TRADEMARK OFFICE
CERTIFICATE OF CORRECTION

PATENT NO. : 4,794,540

DATED : December 27, 1988

INVENTOR(S) : Yevsey Gutman et al.

It is certified that error appears in the above-identified patent and that said Letters Patent is hereby corrected as shown below:

Col. 16, Line 60, delete "date", and insert --data--.

Col. 16, Line 60, delete "represenative", and insert --representative--.

Col. 16, Line 63 (at end of line), delete "-".

Col. 17, Line 1 (at end of line), delete "1-".

Signed and Sealed this

Twenty-second Day of August, 1989

Attest:

DONALD J. QUIGG

Attesting Officer

Commissioner of Patents and Trademarks